US012196029B2

(12) United States Patent
Iijima et al.

(10) Patent No.: US 12,196,029 B2
(45) Date of Patent: Jan. 14, 2025

(54) HINGE DEVICE

(71) Applicant: SUGATSUNE KOGYO CO., LTD., Tokyo (JP)

(72) Inventors: Tadashi Iijima, Tokyo (JP); Kazuma Mori, Tokyo (JP)

( * ) Notice: Subject to any disclaimer, the term of this patent is extended or adjusted under 35 U.S.C. 154(b) by 215 days.

(21) Appl. No.: 17/420,614

(22) PCT Filed: Dec. 20, 2019

(86) PCT No.: PCT/JP2019/050142

§ 371 (c)(1),
(2) Date: Jul. 2, 2021

(87) PCT Pub. No.: WO2020/145094

PCT Pub. Date: Jul. 16, 2020

(65) Prior Publication Data

US 2022/0106824 A1 Apr. 7, 2022

(30) Foreign Application Priority Data

Jan. 11, 2019 (JP) ................................ 2019-003135

(51) Int. Cl.
*E05F 1/02* (2006.01)
*E05D 3/02* (2006.01)
(Continued)

(52) U.S. Cl.
CPC .................. *E05F 3/20* (2013.01); *E05D 3/02* (2013.01); *E05F 1/043* (2013.01);
(Continued)

(58) Field of Classification Search
CPC . Y10T 16/283; Y10T 16/304; Y10T 16/5387; Y10T 16/2771; Y10T 16/539;
(Continued)

(56) References Cited

U.S. PATENT DOCUMENTS 1,039,216 A * 9/1912 Toms et al. ............. E05F 1/063 16/318
3,707,014 A 12/1972 Koivusalo
(Continued)

FOREIGN PATENT DOCUMENTS

EP 1931850 B1 6/2008
FR 3023866 A1 * 1/2016 ............. E05D 7/081
(Continued)

OTHER PUBLICATIONS

EPO, European Search Report dated Sep. 13, 2022 in the corresponding European patent application No. 19908195.1, 8 pages.
(Continued)

*Primary Examiner* — Chuck Y Mah
(74) *Attorney, Agent, or Firm* — Masuvalley & Partners; Peter Martinez

(57) ABSTRACT

A hinge device 1 comprises a damper hinge 2 and a gravity hinge 3. The gravity hinge 3 comprises a rotational force imparting mechanism 70 for converting gravity of the door 6 to rotational force to a closing direction when the door 6 rotates to the closing direction. The damper hinge 2 comprises a damper mechanism 30 for reducing the rotational force to the closing direction of the door 6. The damper mechanism 30 includes a linear damper 31 disposed to the first hinge member 10 and a first cam member 32 and includes a second cam member 35 disposed to the second hinge member 20. The linear damper 31 is positioned far from the shaft member 40 in an orthogonal direction to a shaft line of the shaft member 40 and is positioned along the shaft member 40. When the door 6 rotates to the closing direction and goes down, the linear damper 31 is shortened along with a cam action of the first cam member 32 and the second cam member 35.

6 Claims, 19 Drawing Sheets

(51) Int. Cl.
*E05F 1/04* (2006.01)
*E05F 3/20* (2006.01)

(52) U.S. Cl.
CPC ... *E05Y 2201/212* (2013.01); *E05Y 2201/234* (2013.01); *E05Y 2201/638* (2013.01); *E05Y 2900/132* (2013.01)

(58) Field of Classification Search
CPC . Y10T 16/5398; Y10T 16/534; Y10T 16/524; Y10T 16/53988; F25D 23/028; F25D 23/04; F25D 2323/024; F25D 11/00; F25D 25/025; E05Y 2900/31; E05Y 2201/212; E05Y 2201/234; E05Y 2201/638; E05Y 2201/636; E05Y 2900/102; E05Y 2900/132; E05Y 2600/502; E05D 3/02; E05D 3/20; E05D 5/125; E05D 5/14; E05D 7/081; E05D 7/0027; E05D 11/0054; E05D 5/0246; E05F 1/043; E05F 1/1207; E05F 1/063
See application file for complete search history.

(56) References Cited

U.S. PATENT DOCUMENTS 4,190,925 A 3/1980 Koivusalo
4,692,963 A * 9/1987 Barroero ............... E05F 1/1223 16/284
7,000,289 B2 * 2/2006 Cedrone ................. E05F 1/063 16/273
8,556,330 B2 * 10/2013 Lazarevich ........... E05D 7/1005 16/334
9,739,523 B1 * 8/2017 Augsburger .............. E05D 3/02
2004/0244293 A1 * 12/2004 Eckel ...................... E05D 15/54 49/334
2005/0246863 A1 * 11/2005 Chesworth .............. E05D 7/081 16/221
2010/0232096 A1 * 9/2010 Chen ....................... G09F 9/301 361/679.01
2012/0036678 A1 * 2/2012 Pecar ...................... E05F 5/006 16/250
2014/0033476 A1 * 2/2014 Bacchetti .............. E05D 11/084 16/52
2016/0083993 A1 * 3/2016 Grewe .................. E05F 1/1223 29/428
2017/0022744 A1 * 1/2017 Migli ...................... E05F 5/006
2019/0368257 A1 * 12/2019 Svara ........................ E05F 5/02
2020/0270922 A1 * 8/2020 Veeneman ............ E05D 5/0246

FOREIGN PATENT DOCUMENTS

GB 503447 A 4/1939
GB 2000546 A 1/1979
GB 2281099 A * 2/1995 ......... E05D 11/1078
GB 2479804 A * 10/2011 ................ E05F 3/20
JP 08189248 A * 7/1996
JP 2002-303072 A 10/2002
JP 3713448 B2 10/2002
JP 2007046252 A * 2/2007
JP 2018-009380 A 1/2018
WO WO2007038815 A1 4/2007
WO WO2014006586 A1 1/2014

OTHER PUBLICATIONS

WIPO, Japanese International Search Authority, International Search Report (with English translation) and Written Opinion dated Feb. 10, 2020 in International Patent Application No. PCT/JP2019/050142, 8 pages.
Indian Patent Office, Office Action dated Oct. 27, 2022 in Indian Patent Application No. PCT/JP2016/085355, 5 pages with translation.

* cited by examiner

HINGE DEVICE

RELATED APPLICATIONS

This application is the U.S. National Phase of and claims priority to International Patent Application No. PCT/JP2019/050142, International Filing Date Dec. 20, 2019: which claims benefit of Japanese Patent Application No. 2019-003135 filed Jan. 11, 2019: both of which are incorporated herein by reference in their entireties.

TECHNICAL FIELD

The present invention relates, for example, to a hinge device for making a door rotate automatically using its deadweight toward a closing direction or an opening direction while dumping impacts when it rotates.

BACKGROUND ART

A hinge device disclosed in Patent Literature 1 (JP 2018-9380) comprises a first hinge member fixed to a door frame (first object) and a second hinge member fixed to a door (second object), and a shaft member connecting rotatably these hinge members as a basic configuration. Furthermore, the hinge device comprises a rotational force imparting mechanism for imparting rotational force to the door using deadweight of the door toward a closing direction and a linear damper for dumping impacts under its rotation.

The rotational force imparting mechanism includes a lower cam member having a cylindrical shape and being disposed to the first hinge member, and an upper cam member having a cylindrical shape and being disposed to the second hinge member. The shaft member is disposed to the first hinge member and is positioned such that it passes through these cam members. By cam actions of these cam members, the deadweight of the door is converted to the force toward the closing direction.

The linear damper is disposed to the second hinge member and it is positioned coaxially to the shaft member above it.

On a process when the door is closed automatically, as the door and the second hinge member go down, the linear damper also goes down to contact to an upper end of the shaft member so that the linear damper can be pressed and can dump the rotational force.

SUMMARY OF INVENTION

Problem to be Solved by Invention

In the hinge device of Patent Literature 1, since the shaft member and the linear damper are positioned coaxially, a vertical size of the hinge device becomes large. If the vertical size is tried to reduce, a pressing stroke of the linear damper becomes short such that it can not show a preferable dumping function.

Means for Solving Problem

The present invention is completed to solve the above problem, and in a hinge device comprising a first hinge member attached to a first object, a second hinge member attached to a second object and rotating about a rotation shaft line with respect to the first object, a shaft member connecting rotatably the first hinge member and the second hinge member and its shaft line being provided as the rotation shaft line, a rotational force imparting mechanism converting urging force to a rotational force to the one direction when the second object moves with receiving the urging force along the rotation shaft line to a direction of the urging force and rotates to one direction, a damper mechanism reducing the rotational force of the second object to the one direction; and the damper mechanism comprises a linear damper disposed to one hinge member among the first hinge member and the second hinge member and positioned apart from the shaft member in an orthogonal direction to a shaft line of the shaft member while positioned along the shaft member, a first cam part disposed to the one hinge and positioned at one end of the linear damper, and a second cam part positioned to another hinge member among the first hinge member and the second hinge member and in a process where the second hinge member moves to the direction of the urging force together with the second object while rotating to the one direction, accompanied with a cam action of the first cam part and the second cam part, the linear damper is pressed and shortened.

According to the above aspects, since the linear damper is not positioned on the shaft line of the shaft part and is positioned apart from the shaft line in an orthogonal direction to its shaft line, size enlargement in the shaft direction of the hinge device can be avoided. Furthermore, sufficient strokes of the linear damper can be kept even if the size to the shaft direction of the hinge device is restricted.

Furthermore, the linear damper is compressed, when the second object rotates to the one direction, by shift amounts to the shaft direction of the second object through the first and the second cam parts and is also compressed by the cam action of the first and the second cam part so that the compression strokes can be made longer, and an excellent damper function can be shown.

It is preferred that the linear damper and the first cam part are disposed to the first hinge member, and the second cam part is consisted of a second cam member configured as a separated body from the second hinge member, and the second cam member is attached to the second hinge member adjustably in a position to an orthogonal direction to its shaft line with respect to the shaft member.

According to the above aspects, by adjusting the second cam member in its position, compression strokes of the linear damper can be adjusted and also the damper function by the linear damper can be adjusted.

As for a concrete embodiment, for example, the rotation shaft line extends vertically, and the linear damper and the first cam part are disposed to the first hinge member the first cam part includes a slanted cam face slanting higher and higher as going to the one direction and becoming higher and higher as going farther from the rotation shaft line.

Preferably, the hinge device comprises a dumper hinge and a gravity hinge spaced to the rotation shaft line each other, wherein the rotation shaft line extends vertically, and gravity of the second object is provided as the urging force; the dumper hinge includes the first hinge member, the second hinge member, the shaft member, and the dumper mechanism, the gravity hinge includes a third hinge member attached to the first object; a fourth hinge member attached to the second object; another shaft member connecting rotatably the third hinge member and the fourth hinge member and providing its shaft line as the rotation shaft line, and the rotational force imparting mechanism; the rotational force imparting mechanism includes a third cam member disposed to the third hinge member and having a cylindrical shape and a fourth cam member disposed to the fourth hinge member and disposed above the third cam member and another shaft member is inserted and passed though the third cam member and the fourth cam member.

Preferably, an engagement part protruding to the rotation shaft line is disposed to the third hinge member; a receiver face (92) becoming higher and higher as going to a reverse direction to the one direction is formed to the fourth hinge member (60), and the receiver face is positioned below the engagement part in an angle range of the second object (6) where the linear damper (31) is pressed.

According to the above aspects, in a process where the second object rotates to the one direction, upward flapping of the second object due to the cam action of the first cam member and the second cam member can be prevented by engagement of the receiver face to the engagement part. Thereby, the first cam and the second can stably contact such that the damper action by the linear damper can be provided certainly.

Advantageous Effect

According to the present invention, a hinge device can show an excellent dumping function without making a size along a shaft direction increase.

MODE FOR PRACTICING INVENTION

Figure 1:
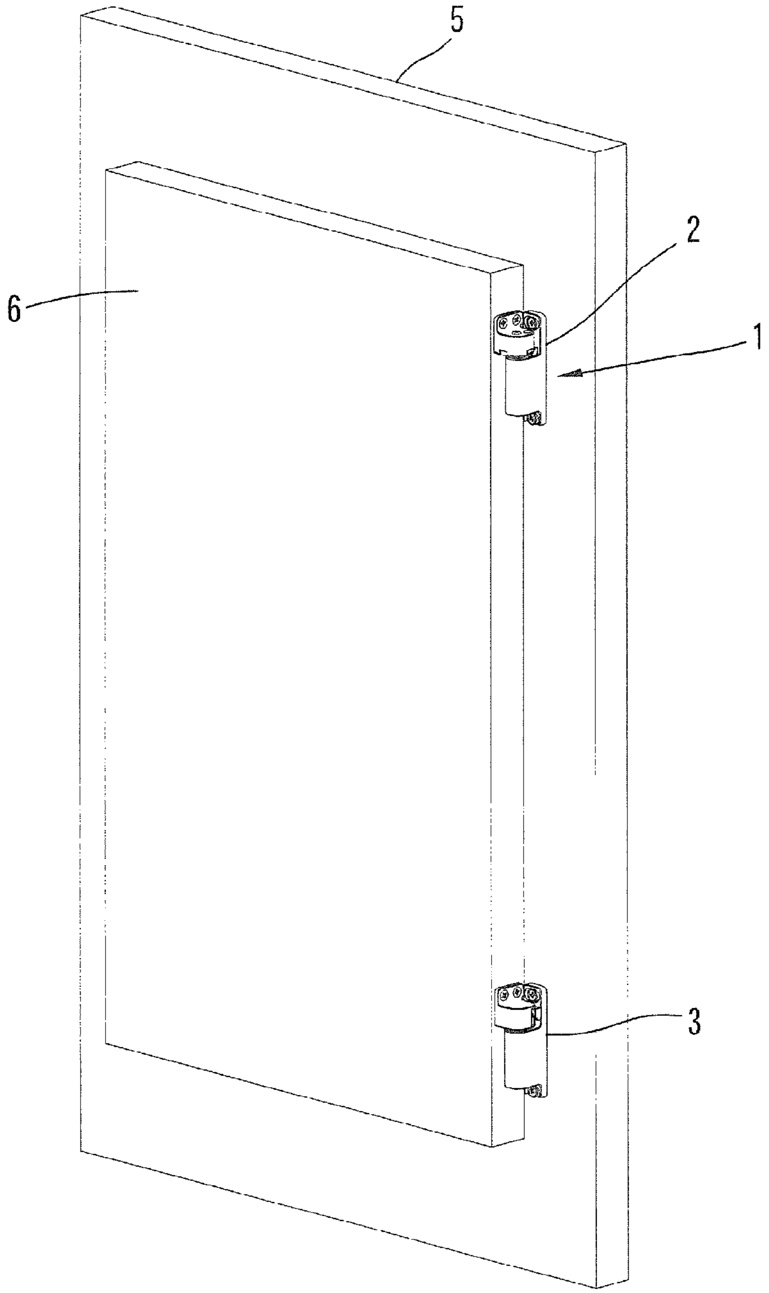
FIG. 1 A perspective view of a hinge device of a first embodiment of the present invention showing a state of door close.

Hereinbelow, a hinge device of one embodiment of the present invention will be described with referencing drawings. As shown in FIG. 1, a hinge device 1 is used to support a door 6 (second object) rotatably to a door frame 5 (first object). The door 6 can rotate from a closed position (opening angle of 0 degree) to an opening angle of 180 degrees in FIG. 1.

Figure 2A:
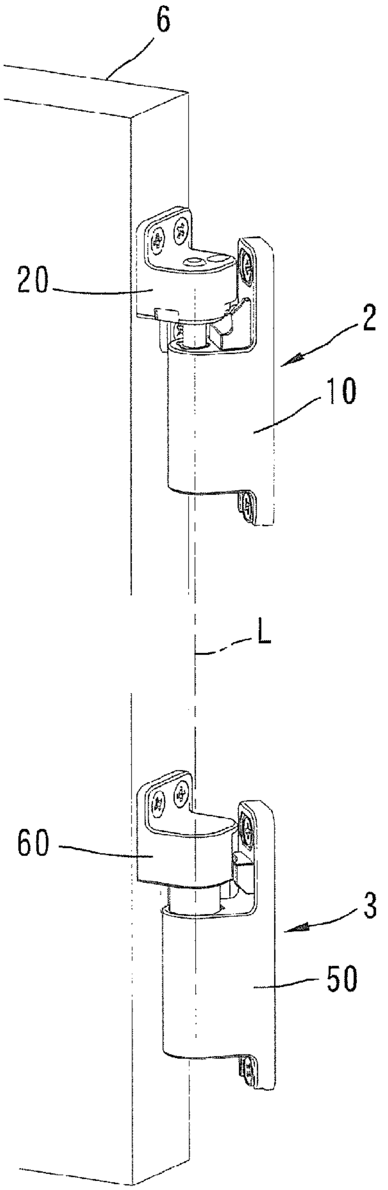
FIG. 2A A perspective view showing an enlarged damper hinge and a gravity hinge of the hinge device.
Figure 2B:
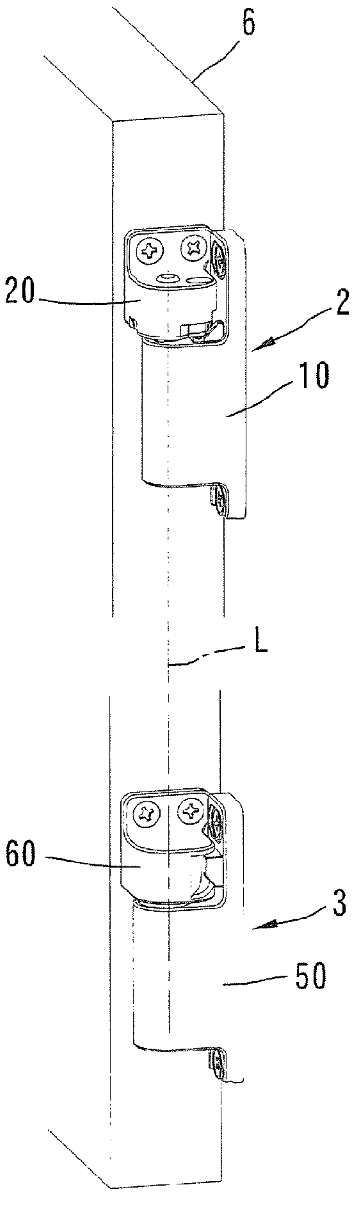
FIG. 2B A drawing corresponding to FIG. 2A showing a state in an opening angle of 0 degrees (closed state).

The hinge device 1 comprises a damper hinge 2 and a gravity hinge 3 spaced vertically. In the present embodiment, the damper hinge 2 is placed above and the gravity hinge is placed below. The damper hinge 2 and the gravity hinge 3 support the door 6 rotatably about a rotational shaft line L extending vertically as shown in FIG. 2A and FIG. 2B. The door 6, in an opened position of FIG. 2A (for example, opening angle of 45 degrees), becomes a higher position in the opening state of FIG. 2A (opening angle of 45 degrees) than a closed state of FIG. 2B (opening angle of 0 degree).

Figure 3:
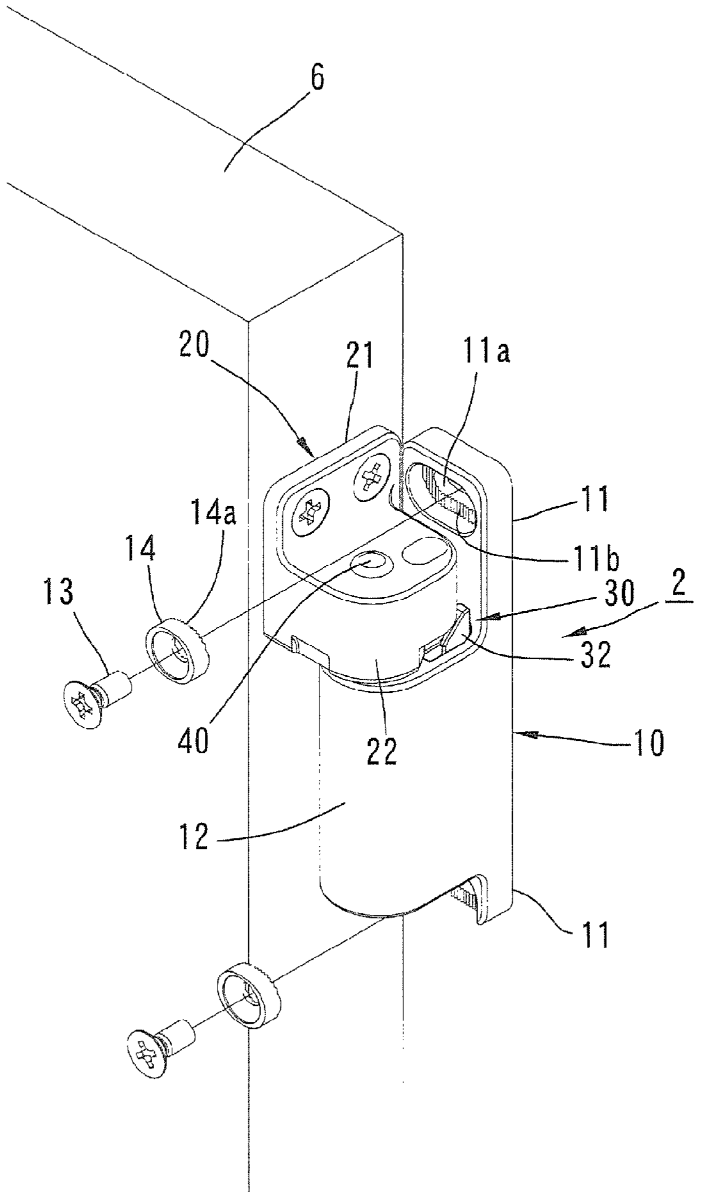
FIG. 3 A perspective view showing an attachment structure of a first hinge member of the damper hinge to a door frame.
Figure 4:
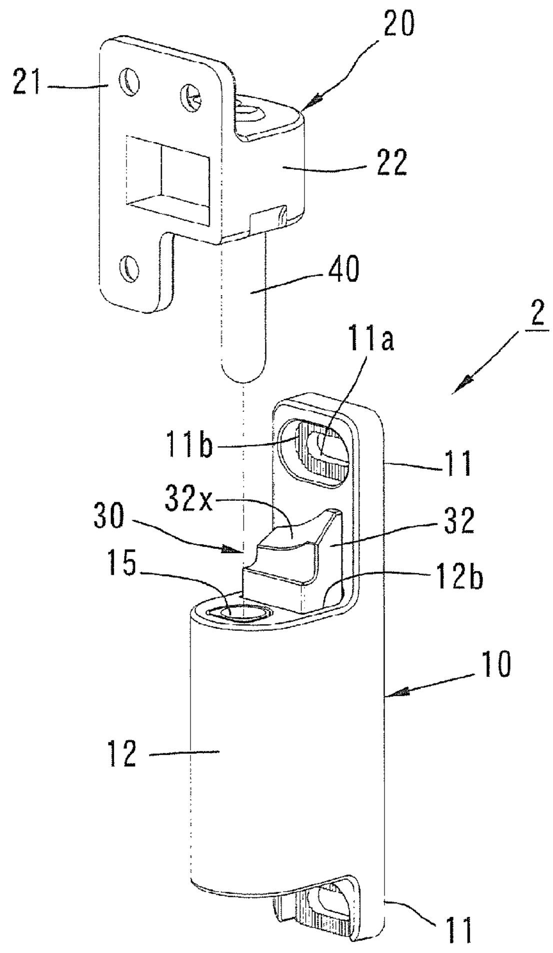
FIG. 4 A perspective view showing the damper hinge exploding into a lower structure including a first hinge member and an upper structure including a second hinge member in a state of the opening angle of 90 degrees.
Figure 5:
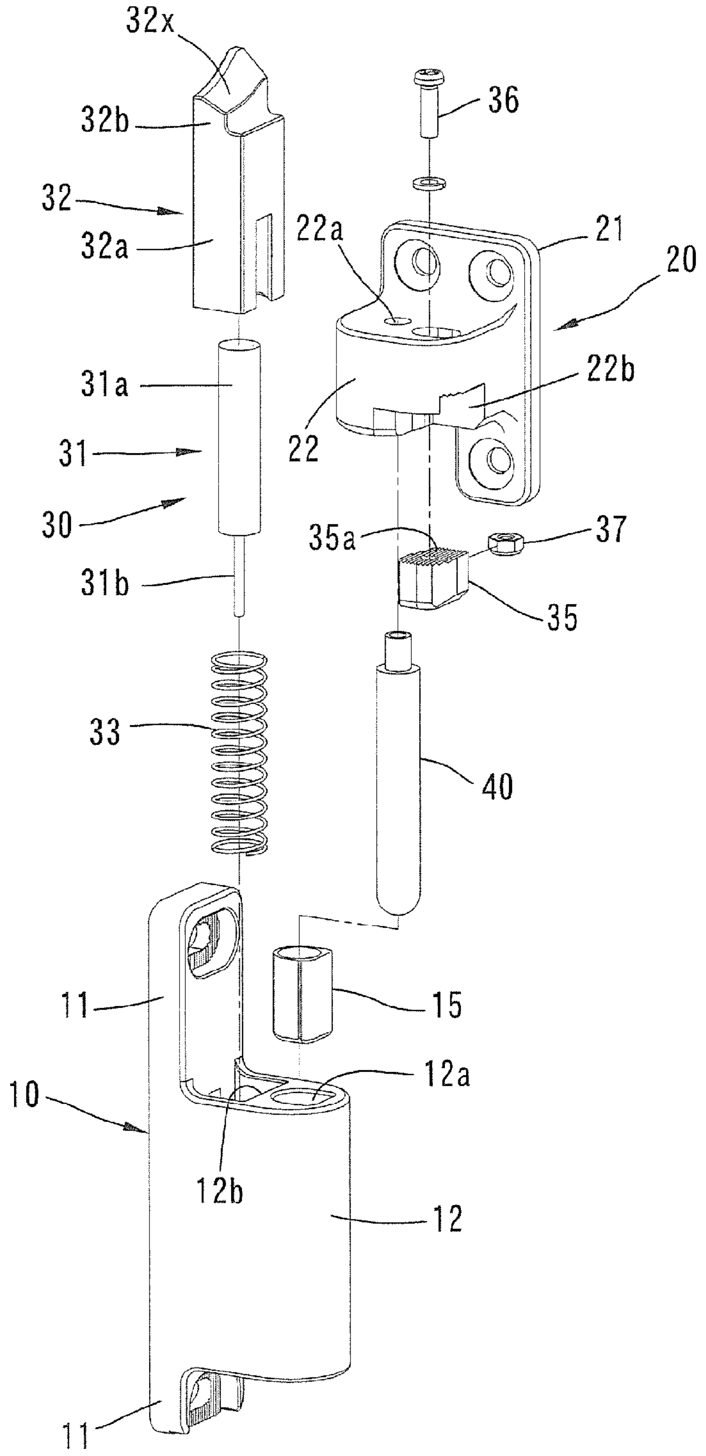
FIG. 5 A perspective view of the damper hinge exploded into every part.

First, explanations about a configuration of the damper hinge 2 will be provided with referring to FIG. 3-FIG. 10. As shown in FIG. 3-FIG. 5, the damper hinge 2 comprises a first hinge member 10 being fixed to the door frame 5, a second hinge member 20 being fixed to an edge face of one side of the door 6 (in the present embodiment, right side), a shaft member 40 connecting rotatably these hinge members 10, 20, and a damper mechanism 30.

The first hinge member 10 includes upper and lower fixture parts 11 and support parts 12 protruding from these fixture parts 11.

The first hinge member 10 is fixed adjustably to the door frame 5 with allowing adjustment of left-and-right positions. In detail, to the fixture part 11, a long hole 11*a* extending left-and-right is formed. By inserting a screw 13 to a washer 14 and the long hole 11*a* and screwing it to a screw hole of the door frame 5, the first hinge member 10 is fixed adjustably to the door 5 while allowing the adjustment of the position along an extension direction of the long hole 11*a* (left and right directions).

With respect to the upper and lower fixture parts 11, at faces facing a front side at a peripheral part of the long hole 11*a*, fine teeth 11*b* extending vertically are formed such that many teeth 11*b* line up along the left and right directions, and to a face of the washer 14 opposite to the fixture parts 11, many fine teeth 14*a* extending to the same direction while lined up along the same direction are also formed. By meshing of these teeth 11*b*, 14*a*, the first hinge member 10 is prevented from displacing to the left and right directions from the adjusted position.

As shown in FIG. 4-FIG. 6, to the support part 12 of the first hinge member 10, a shaft receiver hole 12*a* and a receiver hole 12*b* extending vertically are formed with spacing along a horizontal direction. The shaft receiver hole 12*a* is disposed far from the fixture part 11 and the receiver hole 12*b* is disposed near to the fixture part 11. Into the shaft receiver hole 12*a*, a bushing 15 is fitted.

In the receiver hole 12*b*, as construction elements of a damper mechanism 30, a hydraulic linear damper 31, a first cam member 32 (first cam part) and a return spring 33 are received.

The liner damper 31 includes a cylinder 31*a* and a rod 31*b* extending downward from the cylinder 31*a*. To the cylinder 31*a*, a compressed-coil spring (not shown) is built in, and by this compressed-coil spring, the liner damper 31 is urged to an extension direction. That is to say, the rod 31*b* is urged to a protrusion direction from the cylinder 31*a*. A top of the rod 31*b* abuts to a bottom part of the receiver hole 12*b*.

The first cam member 32 includes a slide part 32*a* received non-rotatably but movably to a shaft direction in the receiver hole 12*b* and a cam part 32*b* formed at an upper side of this slide part 32*a*. A top face of the cam part 32*b* becomes a cam face 32*x*. The cam face 32*x* slants such that the cam face 32*x* becomes higher and higher when going to a clockwise direction about a rotation shaft line L (closing direction of the door 6), and also becomes higher and higher when going to a direction farther and farther from the rotation shaft line L.

To the slide part 32*a* of the first cam member 32, an insertion hole 32*c* (refer to FIG. 8B) is formed, and into this insertion hole 32*c*, the cylinder part 31*a* of the linear damper 31 is inserted. A bottom face of the insertion hole 32*c* abuts to an end face of the cylinder 31*a*. The return spring 33 is configured from a compression-coil spring and urges the first cam member 32 upward.

The second hinge member 20 of the damper hinge 2 includes a fixture part 21 to the door 6, and a support part 22 protruding from this fixture part 21. To the support part 22, an attachment hole 22*a* extending vertically is formed, and to the attachment hole 22*a*, a top end of the shaft member 40 is attached non-movably along the shaft direction. The shaft member 40 is received rotatably in the shaft receiver hole 12*a* of the first hinge member 10 through the bushing 15. The shaft line of the shaft member 40 is provided as the above rotation shaft line L.

As shown in FIG. 5 and FIG. 6, to the lower part of the support part 22 of the second hinge member 20, a concave part 22*b* is formed, and to an upper wall of this concave part 22*b*, a long hole 22*c* extending to directions becoming near and far with respect to the shaft member 40 (rotation shaft line L) is formed. To the above concave part 22*b*, a second cam member 35 (second cam part) as a configuration element of the damper mechanism 30 is received.

Figure 7A:
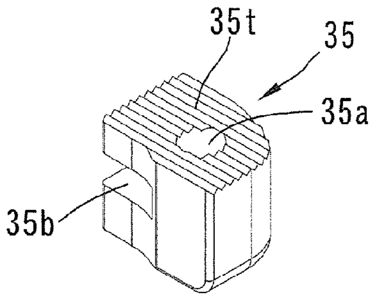
FIG. 7A A perspective view of the second cam member viewed from above.
Figure 7B:
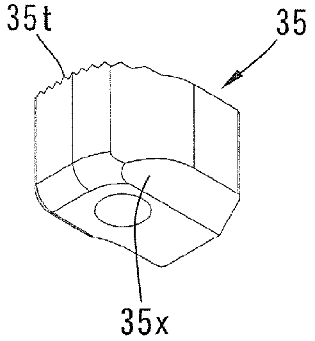
FIG. 7B A perspective view of the second cam member viewed from below.

As shown in FIG. 7, the second cam member 35 includes a vertical through hole 35*a* and a nut insertion concave part 35*b* extending horizontally and opening at a lateral face. The through hole 35*a* and the nut insertion concave part 35*b* are continued.

Figure 6A:
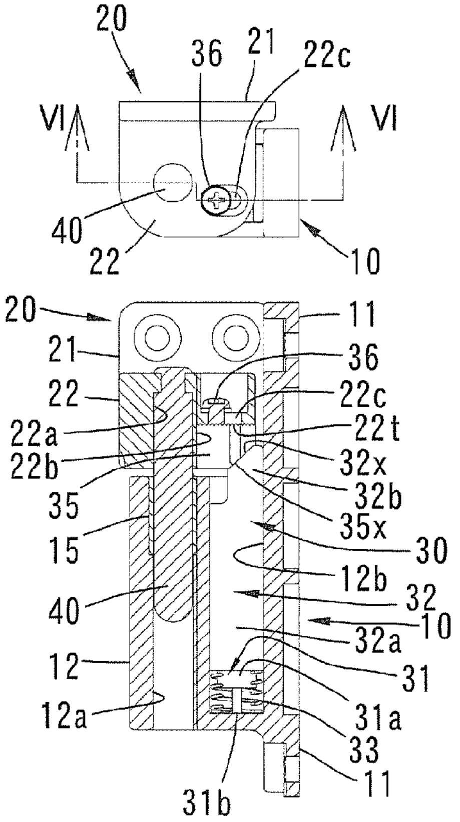
FIG. 6A In a position adjustment of the second cam member of the damper hinge, a plane view of a state where the second cam member goes nearest to a rotation shaft line a dm a vertical cross-sectional view of this plane view along a line VI-VI.
Figure 6B:
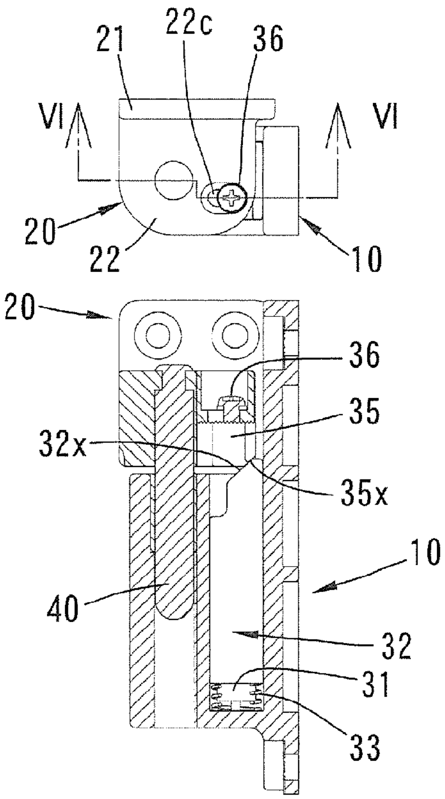
FIG. 6B A plane view showing a state where the second cam member goes farthest from the rotation shaft line and a vertical cross-sectional view of the plane view along a line VI-VI.

By inserting the screw 36 to the long hole 22*c* of the second hinge member 20 and the through hole 35*a* of the second cam member 35, and then screwing to a nut 37 (refer to FIG. 5) having been inserted into a nut insertion concave part 35*b*, the second cam member 35 is fixed to the second hinge member 20 while allowing the adjustment to the elongation direction of the long hole 22*c*. More concretely, the second cam member 35 can be adjusted in its position by displacing near to the shaft member 40 as shown in FIG. 6A and displacing far from the shaft member 40 as shown in FIG. 6B.

As shown in FIG. 7, at the upper face of the second cam member 35, many fine gear teeth 35*t* are formed while lining up along the elongation direction of the long hole 22*c* and extending to an orthogonal direction to the elongation direction of the long hole 22*c*. To the upper face of the concave part 22*b* of the second hinge member 20, many fine teeth 22*t* having the same lining up direction and the extension direction with the teeth 35*t* are formed (refer to FIG. 6A). By meshing between these teeth 35*t*, 22*t*, the second cam member 35 is prevented from displacing from the adjusted position (displacement to the elongation direction of the long hole 22*c*).

At the lower end part of the above second cam member 35, the face opposite to the above shaft member 40 is provided as a cam face 35*x*. Cam actions between the cam face 35*x* and the cam face 32*x* of the first cam member 32 will be described later.

Figure 11:
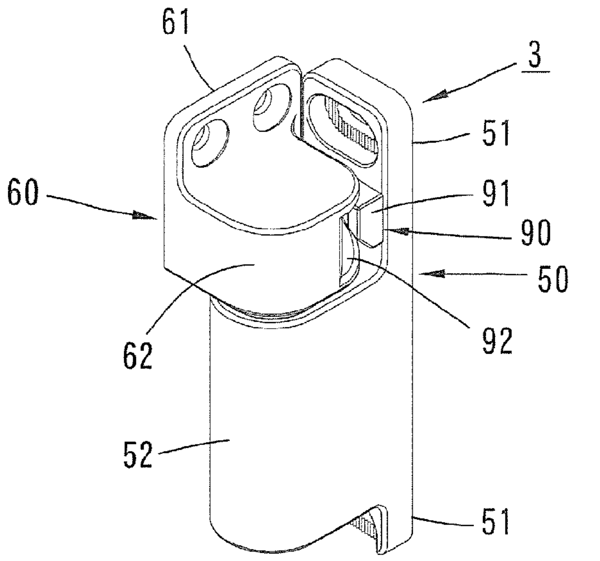
FIG. 11 A perspective view of the gravity hinge in a state where the opening angle of the door is 0 degree.
Figure 12:
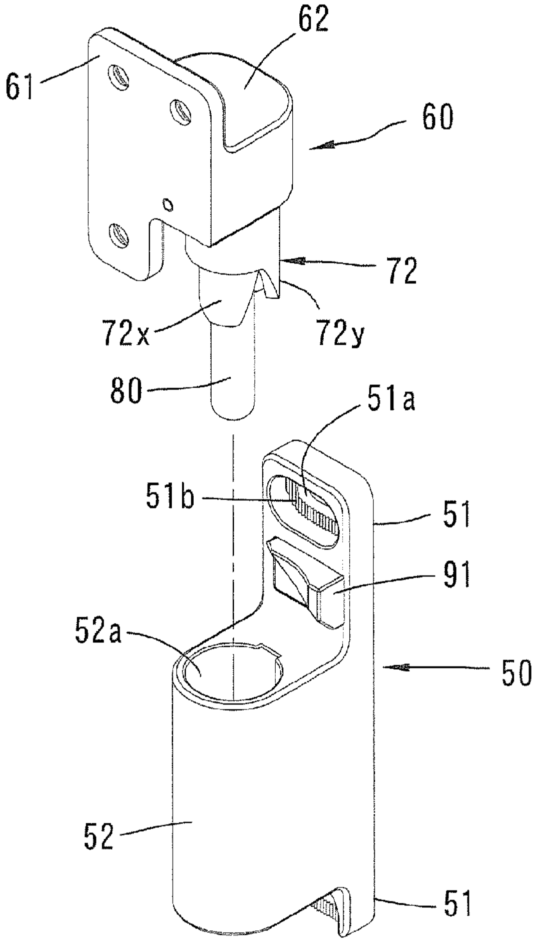
FIG. 12 A perspective view showing the gravity hinge exploding into a lower structure including a third hinge member and an upper structure including a fourth hinge member in a state where the opening angle of the door is 90 degrees.
Figure 13:
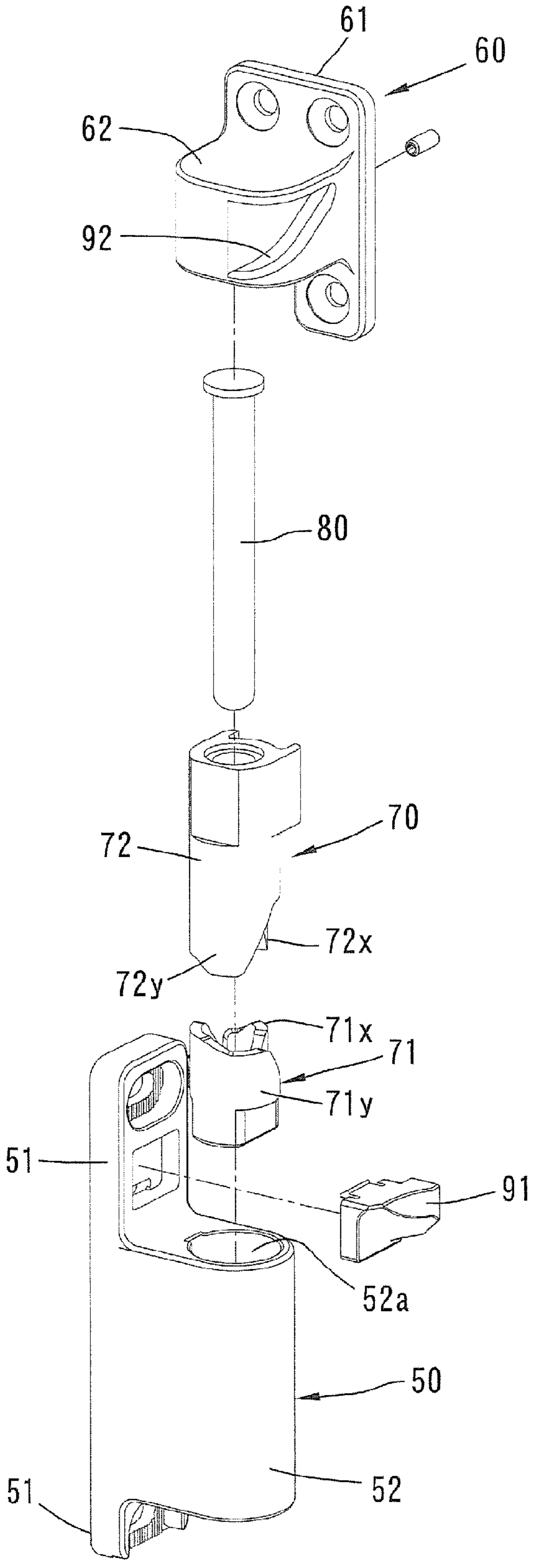
FIG. 13 A perspective view of the gravity hinge exploded into every part.

Next, the gravity hinge 3 will be explained with referring to FIG. 11-FIG. 18. The gravity hinge 3 comprises, as shown in FIG. 11-FIG. 13, a third hinge member 50 fixed to the door frame 5, a fourth hinge member 60 fixed to a face at one side edge of the door 6, a shaft member 80 connecting these hinge members 50, 60 rotatably, and a rotational force imparting mechanism 70.

The third hinge member 50 includes upper and lower fixture parts 51 and support parts 52 protruding from these fixture part 51.

To the fixture part 51, a long hole 51*a* extending to left-and-right, and around the long hole 51*a*, many fine teeth 51*b* extending vertically and lined-up to the left-and-right direction are formed. The third hinge member 50 is fixed to the door frame 5 in the condition allowing to adjust the position while stopping displacement similarly to the first hinge member 10.

Figure 14A:
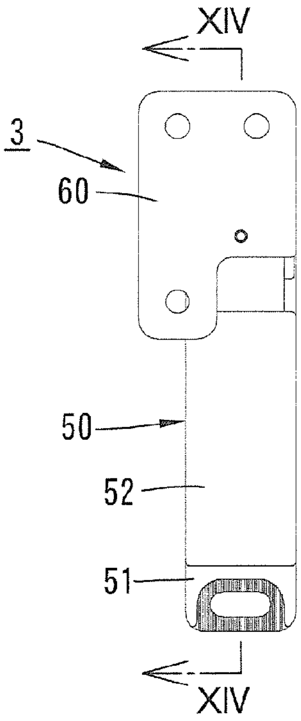
FIG. 14A A side view of the gravity hinge in a state where the opening angle of the door is 90 degrees.
Figure 14B:
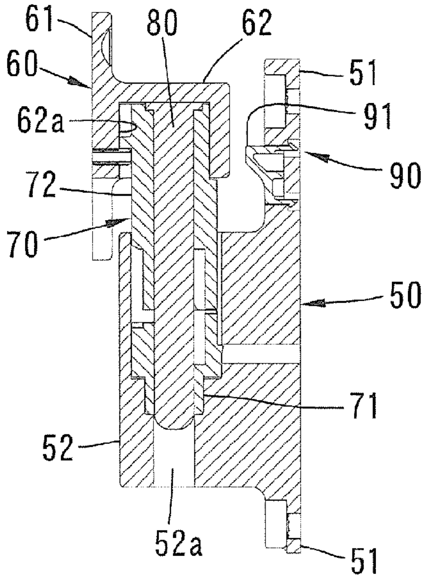
FIG. 14B A vertical cross-sectional view along a line XIV-XIV in FIG. 14A.

To the support part 52 of the third hinge member 50, a support hole 52*a* extending vertically and having a step is formed. As shown in FIG. 13, FIG. 14, at the lower part of this support hole 52*a*, the third cam member 71 as a configuration element of the rotational force imparting mechanism 70 is received non-rotatably. The third cam member 71 has a cylinder shape and has an inner cam part 71*x* with a smaller diameter and an outer cam part 71*y* having a larger diameter. Upper faces of these inner cam part 71$x$ and outer cam part 71$y$ become cam faces.

The fourth hinge member 60 includes a fixture part 61 to the door 6 and a support part 62 protruding from this fixture part 61. To the support part 62, an attachment hole 62$a$ having an opening at a lower end is formed, and to the attachment hole 62$a$, an upper end part of the fourth cam member 72 as the configuration elements of the rotation force imparting mechanism 70 is attached non-rotatably. The fourth cam member 72 has a cylindrical shape and protrudes vertically and downwardly from the support part 62 such that its lower end part is inserted into the upper part of the support hole 52$a$ of the above third hinge member 50.

The fourth cam member 72 has an inner cam part 72$x$ with a smaller diameter and an outer cam part 72$y$ having a larger diameter. Lower faces of these inner cam part 72$x$ and outer cam part 72$y$ become cam faces.

The cam faces of the inner cam parts 71$x$, 72$x$ of the third cam member 71 and the fourth cam member 72 contact each other and the cam faces of the outer cam 71$y$, 72$y$ contact each other.

To the support part 62 of the fourth hinge member 60, the upper part of the shaft member 80 is attached non-movably with respect to a shaft direction. The shaft member 80 is inserted into the fourth cam member 72 to protrude downward from the fourth cam member 72 and is inserted into the third cam member 71. The shaft line of this shaft member 80 is provided as the above rotation shaft line L.

As shown in FIG. 11-FIG. 13, the gravity hinge 3 of the present embodiment further comprises a regulation mechanism 90. This regulation mechanism 90 includes an engagement member 91 (engagement part) attached to an upper fixture part 51 of the third hinge member 50 and a receiver face 92 formed to a circumferential wall surrounding the attachment hole 62$a$ of the fourth hinge member 60. The engagement member 91 protrudes toward the shaft member 80 from the upper fixture part 51. The receiver face 92 slants as the receiver face becomes higher and higher when going to the counterclockwise direction (opening direction of the door). The engagement member 91 has a lower face slanting to the same direction with the receiver part 92.

The hinge device 1 configured above will be explained. First, the basic function of the gravity hinge 3 will be explained.

Figure 18A:
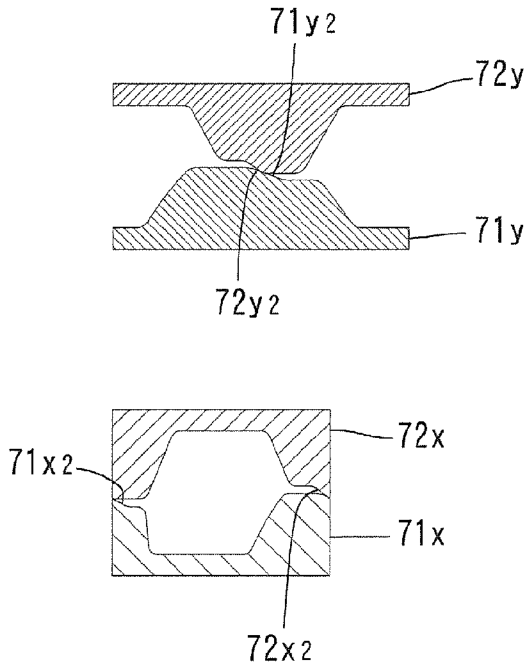
FIGS. 18A, 18B and 18C A development view explaining action between outer cam parts each other and inner cam parts each other of the third and fourth cam members in the gravity hinge showing a state where the opening angle of the door is 180 degrees.
Figure 18B:
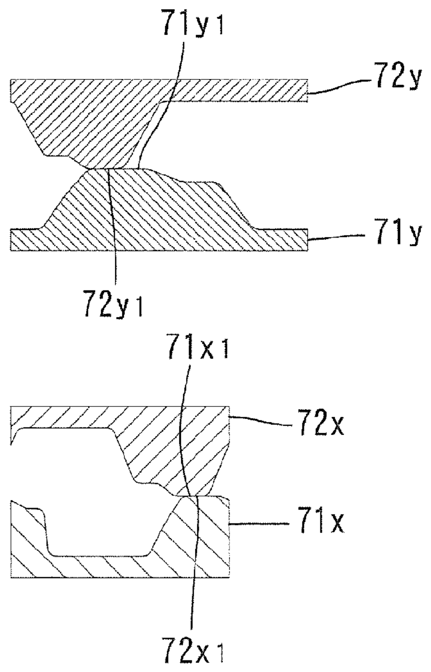

As shown in FIG. 18B, when the opening angle of the door 6 is 90 degrees, on a horizontal part 71$y_1$ in the cam face of the outer cam part 71$y$ of the third cam member 71, a horizontal part 72$y$1 in the cam face of the outer cam part 72$y$ of the fourth cam member 72 is placed. Furthermore, on the horizontal part 71$x_1$ in the cam face of the inner cam part 71$x$ of the third cam member 71, the horizontal part 72$x$1 in the cam face of the outer cam part 72$x$ of the fourth cam member 72 is placed. Thereby, deadweight of the door 6 can be received by the third hinge member 50 through the fourth hinge member 60 and the cam members 71, 72. As described above, when the opening angle of the door 6 is in an angle range of 45 degrees-170 degrees, the deadweight of the door 6 can be received. In this condition, the door 6 is made to rotate only by human power.

When the door is rotated to the opening direction and the opening angle becomes larger than 170 degrees, as shown in FIG. 18A, to the slanted part 71$y_2$ of the cam face of the outer cam part 71$y$, the slanted part 72$y_2$ in the cam face of the outer cam part 72$y$ abuts and to the slanted part 71$x_2$ of the cam face of the inner cam part 71$x$, the slanted part 72$x_2$ of the cam face of the inner cam part 72$x$ abuts. Thereby, the deadweight of the door 6 is, by the cam action of the above cam members 71, 72, converted to the force for making the door 6 rotate to the opening direction (according to the present embodiment, the counterclockwise direction). As the result, the door 6 rotates automatically downward to the opening direction and reaches the opening position of 180 degrees. Since the door 6 is imparted with the rotational force even at the opening position of 180 degrees, the opening position of 180 degrees can be kept stably.

When the door 6 is rotated to the closing direction from the opening position of 180 degrees, the door is made to rotated against the rotational force generated by the above cam action.

Figure 18C:
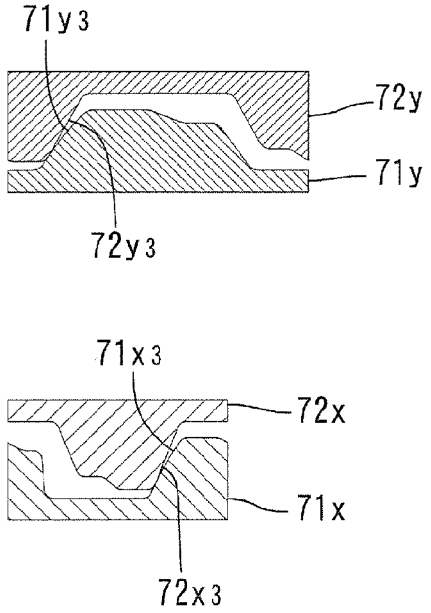

When the door 6 rotates to the closing direction and the opening angle becomes smaller than 45 degrees, as shown in FIG. 18C, to the slanted part 71$y_3$ of the cam face of the outer cam part 71$y$, the slanted part 72$y_3$ in the cam face of the outer cam part 72$y$ abuts, and to the slanted part 71$x_3$ of the cam face of the inner cam part 71$x$, the slanted part 72$x_3$ in the cam face of the inner cam part 72$x$ abuts. Thereby, the deadweight of the door 6 is, by the cam action of the above cam members 71, 72, converted to the force for making the door 6 rotate to the closing direction (according to the present embodiment, the clockwise direction). As the result, the door 6 rotates downwardly and automatically to the closing direction and reaches the closed position of the opening angle of 0 degrees. Since the door 6 is imparted with the rotational force even at the closed position, the closed position of 180 degrees can be kept stably.

When the door 6 is rotated from the closed position to the opening position, the door 6 is rotated against the rotational force generated by the above cam action.

As described above, though the door 6 is automatically closed from the opening angle from 45 degrees to 0 degrees by the cam action of the rotational force imparting mechanism 70 assembled to the above gravity hinge 3, its rotational force is reduced by the damper mechanism 30 of the damper hinge 2 so that the impact to the door frame 5 can be reduced when the door 6 reaches the closed position.

Hereunder, the action of the damper hinge 2 will be explained in detail.

Since the linear damper 31 is disposed apart from the shaft member 40 in the horizontal direction along the shaft member 40, strokes of the linear damper 31 can be kept sufficiently without increasing the vertical size (size along to the shaft direction) of the damper hinge 2.

Figure 8A:
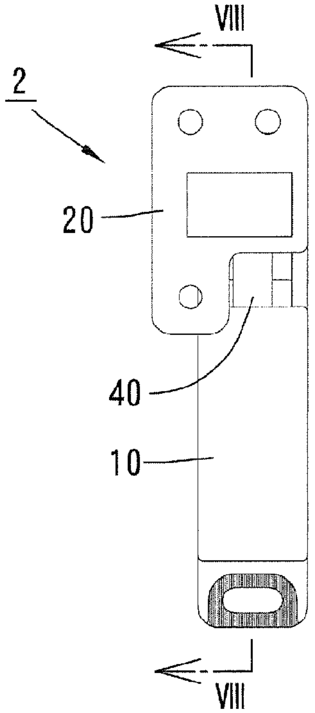
FIG. 8A A side view of the damper hinge in a state where the opening angle of the door is 90 degrees.
Figure 8B:
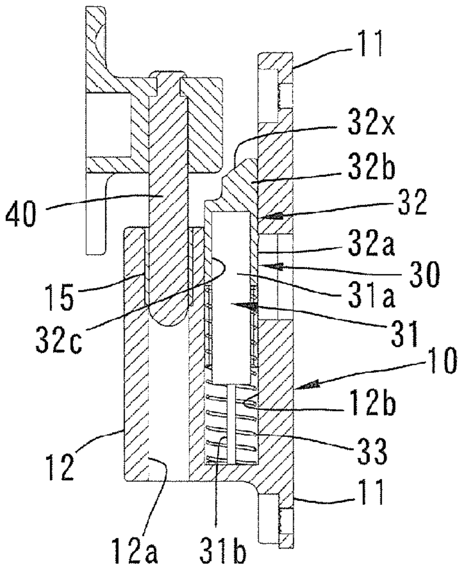
FIG. 8B A vertical cross-sectional view along a line VIII-VIII in FIG. 8A.

As shown in FIG. 8B, when the opening angle of the door 6 is 90 degrees, to the first cam member 32 disposed to the first hinge member 10, the second cam member 35 disposed to the second cam member 20 does not abut.

Figure 9A:
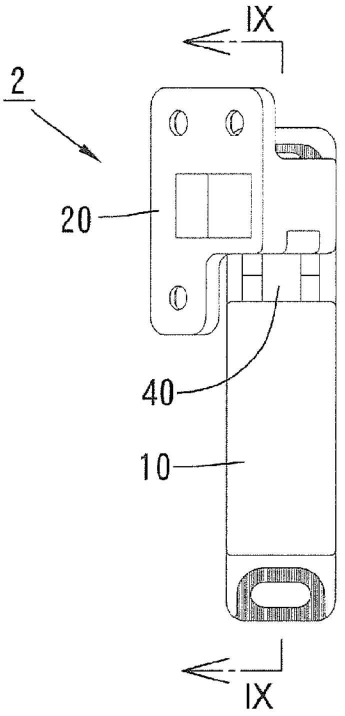
FIG. 9A A side view of the damper hinge in a state where the opening angle of the door is 45 degrees.
Figure 9B:
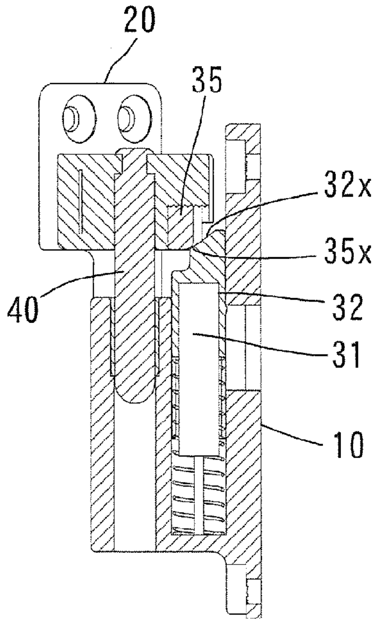
FIG. 9B A vertical cross-sectional view along a line IX-IX in FIG. 9A.

When the door 6 is made to rotated toward the closing direction and reaches the opening angle of 45 degrees, as shown in FIG. 9B, to the cam face 32$x$ of the first cam member 32, the cam face 35$x$ of the second cam member 35 begins to abut.

Figure 10A:
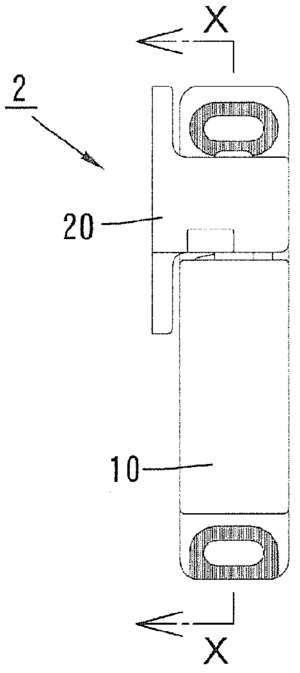
FIG. 10A A side view of the damper hinge in a state where the opening angle of the door is 0 degree.
Figure 10B:
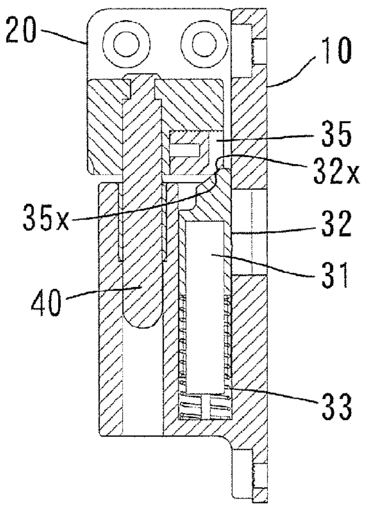
FIG. 10B A vertical cross-sectional view along a line X-X in FIG. 10A.

When the opening angle of the door 6 becomes smaller than 45 degrees, the door 6, as described above, automatically rotates to the closing direction accompanied with downturn. At this time, as shown in FIG. 10, the second cam member 35 goes down only by amounts of the downturn of the door 6 to push down the first cam member 32.

Furthermore, the second cam member 35 rotates to the clockwise direction about the rotation shaft line L, and since the cam face 32$x$ of the first cam member 32 becomes higher and higher as going to the clockwise direction so that the first cam member 32 can be pushed down also by the cam action of the cam face 32$x$ and the cam face 35$x$.

As described above, since the first cam member 32 pushes to compress the linear damper 31 in the downturn amount adding up the downturn amounts associated with the downturn of the door 6 and the downturn amounts associated with the above cam actions, compression amounts of the linear damper 31 can be increased, thereby reducing the rotational force of the door 6 so that the impact when closing the door 6 can be excellently dumped.

In the present embodiment, the cam face 32*x* of the first cam member 32 slants with becoming higher and higher as going farther and farther from the shaft member 40. Thus, by adjusting the position of the second cam member 35, compression amounts of the linear damper 31 can be adjusted such that the damper function can be adjusted. Explaining concretely, when as shown in FIG. 6A the second cam member 35 is made to become near to the shaft member 40, the compression amounts of the linear damper 31 is reduced so that the damper function can be weakened. Contradictory to this, when the cam member 35 is adjusted in its position as shown in FIG. 6B going farther and farther from the shaft member 40, the compression amounts of the linear damper 31 is increased so that the damper function cam be increased.

Next, the action of the regulation mechanism 90 of the gravity hinge 3 will be explained.

Figure 17A:
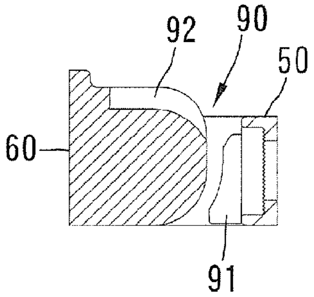
FIG. 17A A plane cross-sectional view showing positional relations between a receiver face of the fourth hinge member and an engagement part of the third hinge member in a state where the opening angle of the door is 90 degrees.

As shown in FIG. 14, FIG. 17A, when the opening angle of the door 6 is 90 degrees, the receiver face 92 of the fourth hinge member 60 departs in a circumferential direction from the engagement member 91 of the third hinge member 50.

Figure 15A:
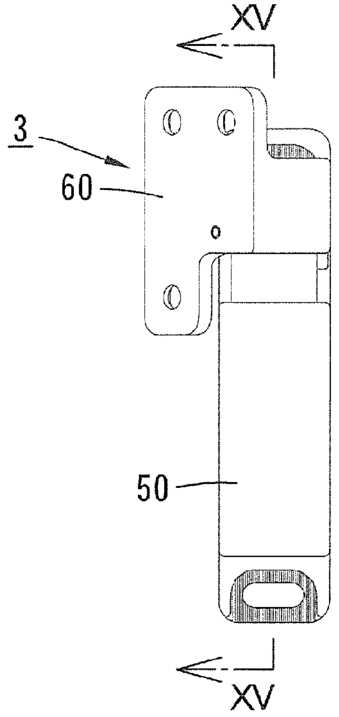
FIG. 15A A side view of the gravity hinge in a state where the opening angle of the door is 45 degrees.
Figure 15B:
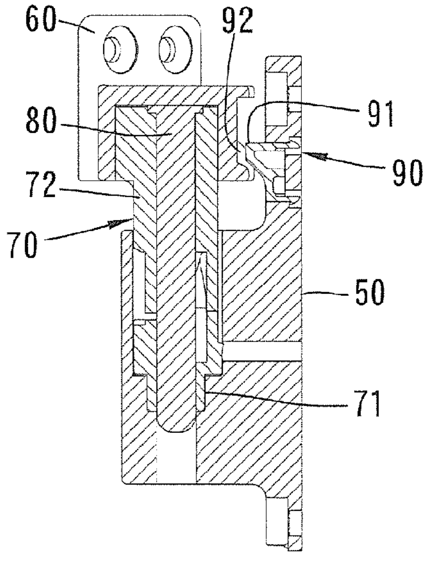
FIG. 15B A vertical cross-sectional view along a line XV-XV in FIG. 15A.
Figure 17B:
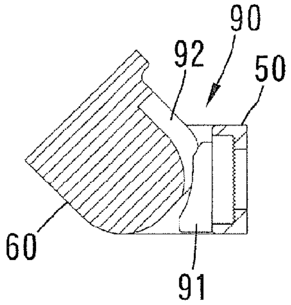
FIG. 17B A drawing corresponding to FIG. 17A showing a state where the opening angle of the door is 45 degrees.

As shown in FIG. 15, FIG. 17B, when the opening angle of the door 6 reaches 45 degrees, an end part of the receiver face 92 enters below the engagement member 91.

Figure 16A:
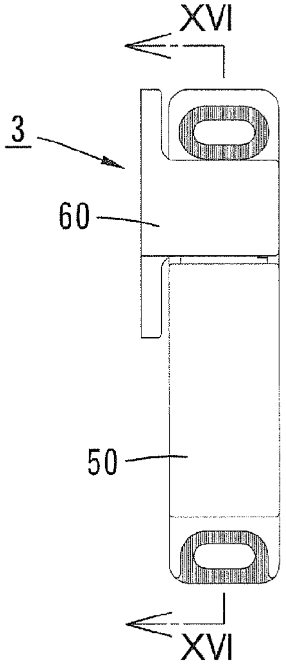
FIG. 16A A side view of the gravity hinge in a state where the opening angle of the door is 0 degree.
Figure 16B:
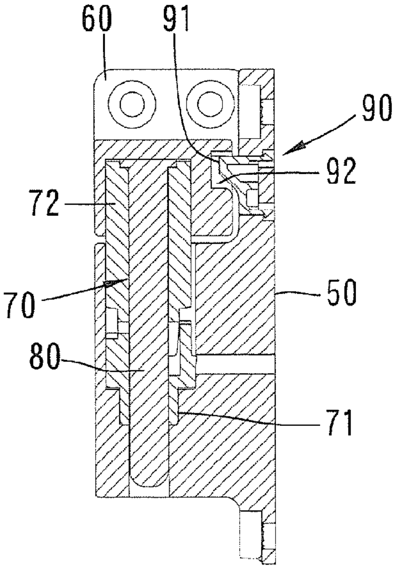
FIG. 16B A vertical cross-sectional view along a line VXI-VXI in FIG. 16A.
Figure 17C:
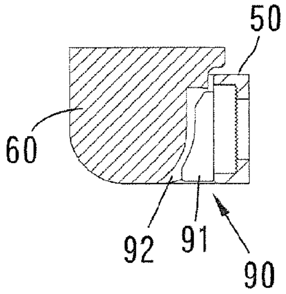
FIG. 17C A drawing corresponding to FIG. 17A showing a state where the opening angle of the door is 0 degree.

As shown in FIG. 16. FIG. 17C, when the opening angle of the door 6 is 0 degree, the whole body of the receiver face 92 of the fourth hinge member 60 enters below the engagement member 91 of the third hinge member 50.

As described above, when the opening angle of the door is 45 degrees-0 degree, the receiver face 92 is positioned below the engagement member 91. The door 6 goes down in a course of the automatic closing and the fourth hinge member 60 also goes down, however, since the receiver face 92 becomes higher and higher when going to the counter-clockwise direction (opening direction of the door), the above downturn amounts can be canceled. Thus, the receiver face 92 in the above angle ranges can contact to the lower face of the engagement member 91 or can keep the opposing state with having slight spacing.

If the regulation mechanism 90 is not present, when the door 6 is rotated vigorously to the closing direction, by the cam action of the first cam member 32 and the second cam member 35 of the linear damper 31, the door 6 is flapped (displaced). Thus, there is the possibility that the door 6 rotates to the closing direction under the condition where the damper action of the linear damper 31 is weakened. In the present embodiment, the gravity hinge 3 makes the receiver face 92 of the fourth hinge member 60 engage to the engagement member 91 of the third hinge member 50, and the upward displacement of the door 6 is regulated so that the damper function of the linear damper 31 can be surely shown and the door 6 can be closed gently.

Now, by the above regulation mechanism 90, when the opening angle of the door 6 is in the range of 0 degree-45 degrees, the door 6 can not be withdrawn upward. Thus, the regulation mechanism 90 can provide a role of a theft protection for the door 6.

Figure 19:
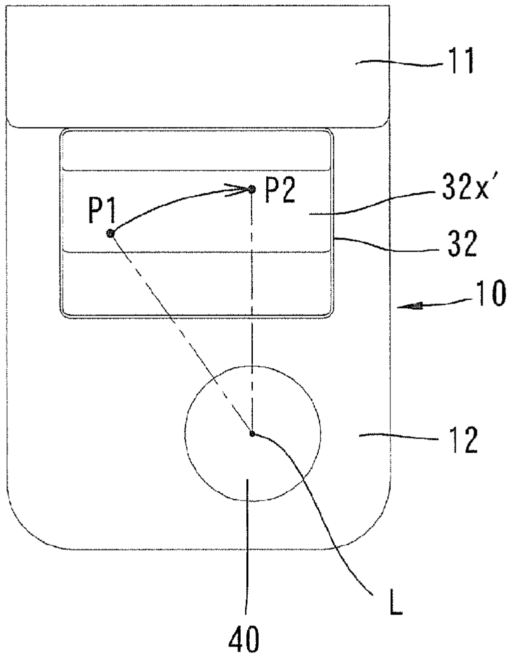
FIG. 19 A plane view of a lower structure of a damper hinge according to a second embodiment of the present invention.

Next, a second embodiment of the present invention will be explained with reference to FIG. 19. In this embodiment, the first cam member 32 has a flat cam face 32*x*'. This cam face 32*x*' slants as becoming higher and higher when going farther and farther from the rotation shaft line L (shaft member 40). The cam face 32*x*' is positioned biasedly with respect to the shaft member 40.

Since the other configuration of same with the first embodiment, detailed explanation will be omitted.

When the door 6 is in the opening angle of 45 degrees, a contact part of the second cam member 35 abuts to a point P1 on the cam face 32*x*'. When the door 6 is in the opening angle of 0 degree (closed position), the contact part of the second cam member 35 abuts to a point P2 on the cam face 32*x*'. Since the point P2 is positioned farther from the rotation shaft line than the point P1, the point P2 is higher than the point P1. As the result, as the door 6 rotates to the closing direction, by the cam action between the contact part of the second cam member 35 and the cam face 32*x*' of the first can member 32, the linear damper 30 is compressed.

The feature that the damper function of the linear damper 30 can be adjusted by the position adjustment of the second cam member 35 is similar with the first embodiment.

The present invention is not limited to the above practice and various modifications may be adopted within the scope of its purport.

For example, the rotational force imparting mechanism may impart, when the door rotates to the opening direction, the rotational force to the opening direction by the deadweight of the door over wider angle ranges. In this case, the damper mechanism can be configured to show the dumping function when the door rotates to the opening direction. More concretely, inclinations of the cam face of four cam members become reversed with respect to the first embodiment, and inclinations of the regulation mechanism become reversed accordingly.

It may be allowed to dispose the linear damper and the first cam member to the second hinge member and to dispose the second cam member to the first hinge member. In this case, the linear damper as well as the fist cam member go down as the door goes down.

The first cam part may be formed integrally with the linear damper. The second cam part may be formed integrally with the first hinge member or the second hinge member.

The rotational force imparting mechanism and the damper mechanism may be assembled into one hinge.

In the above embodiments, when the door is in the opening angle of 45-170 degrees, the gravity hinge receives the deadweight of the door, and when the opening angle becomes lower than 45 degrees, it imparts the rotational force to the door, however, the angle position of the door may be modified appropriately depending on usage situations of the hinge device. For example, it may be allowed to configure to impart the rotational force when the opening angle of the door becomes less than 60 degrees.

In the above embodiments, the cam face is formed to the first cam part and the second cam part bears a role of a working element, however, slanted cam faces may be formed to both of the first and the second cam parts.

The rotation shaft line may be horizontal. In this case, the door is urged to the rotation shaft line by a spring rather than the deadweight of the door.

INDUSTRIAL APPLICABILITY

The present invention can be, for example, applied to a hinge device which makes a door open automatically by using deadweight of the door.

The invention claimed is:

1. A hinge device comprising a plurality of hinges, wherein each of the plurality of hinges comprises a first hinge member (10) attached to a first object (5), a second hinge member (20) attached to a second object (6) and rotating about a rotation shaft line (L) with respect to the first object, a shaft member (40) connecting rotatably the first hinge member and the second hinge member and its shaft line being provided as the rotation shaft line, wherein the first hinge member (20) and the second hinge member (40) relatively move in a direction of the rotation shaft line (L);

wherein at least one of the plurality of hinges comprises a rotational force imparting mechanism (70), and at least one of the plurality of hinges comprises a damper mechanism (30), wherein the rotational force imparting mechanism (70) and the damper mechanism (30) is assembled into same hinge of the plurality of hinges or is assembled into different hinges of the plurality of hinges, wherein the rotational force imparting mechanism (70) comprises a lower cam member (72) having a cylindrical shape and being disposed to the first hinge member (10), and an upper cam member (71) having a cylindrical shape and being disposed to the second hinge member (20), the shaft member (40) is disposed to the first hinge member (10) and is positioned such that it passes through the upper cam member (71) and the lower cam member (72), wherein, when the second object (6) goes down by a deadweight, the deadweight of the second object (20) is converted to a rotational force to a closing direction or an opening direction, wherein a damper mechanism (30) reduces the rotational force of the second object to the closing direction or the opening direction, wherein the damper mechanism (30) comprising, a linear damper (31) disposed to one hinge member among the first hinge member (10) and the second hinge member (20) and positioned apart from the shaft member (40) in an orthogonal direction to a shaft line of the shaft member while positioned along the shaft member, a first cam part (32) disposed to the one hinge and positioned at one end of the linear damper, and a second cam part (35) positioned to another hinge member among the first hinge member (10) and the second hinge member (20)

wherein in a process where the second hinge member (20) of each of the plurality of hinges goes down together with the second object (6) while rotating to the closing direction or the opening direction, accompanied with a cam action of the first cam part (32) and the second cam part (35), the linear damper (31) is pressed and contracted.

2. The hinge device of claim 1, wherein the linear damper (31) and the first cam part (32) are disposed to the first hinge member (10), and wherein the second cam part (35) is consisted of a second cam member configured as a separated body from the second hinge member (20), and the second cam member is attached to the second hinge member adjustably in a position to an orthogonal direction to its shaft line with respect to the shaft member (40).

3. A hinge device of claim 2, wherein the rotation shaft line (L) extends vertically, and the linear damper (31) and the first cam part (32) are disposed to the first hinge member (10) such that the first cam part includes a slanted cam face (32*x*) slanting higher and higher as going to the closing direction or the opening direction and becoming higher and higher as going farther from the rotation shaft line.

4. A hinge device comprising a damper hinge (2) and a gravity hinge (3) positioned on a rotation shaft line (L) and spaced from each other, wherein the damper hinge (2) includes the first hinge member (10) attached to a first object (5), the second hinge member (20) attached to a second object (6) and rotating about the rotation shaft line (L) with respect to the first object, the shaft member (40) connecting rotatably the first hinge member and the second hinge member and its shaft line being provided as the rotation shaft line, and a damper mechanism (30), wherein the gravity hinge (3) includes, a third hinge member (50) attached to the first object (5), a fourth hinge member (60) attached to the second object (6), another shaft member (80) connecting rotatably the third hinge member and the fourth hinge member and providing its shaft line as the rotation shaft line, and a rotational force imparting mechanism (70), wherein all the damper mechanism (30) reduces the rotational force of the second object to the closing direction or the opening direction, wherein the damper mechanism (30) comprising, a linear damper (31) disposed to one hinge member among the first hinge member (10) and the second hinge member (20) and positioned apart from the shaft member (40) in an orthogonal direction to a shaft line of the shaft member while positioned along the shaft member, a first cam part (32) disposed to the one hinge and positioned at one end of the linear damper, and a second cam part (35) positioned to another hinge member among the first hinge member (10) and the second hinge member (20)

wherein the rotation shaft line extends vertically and gravity of the second object (6) is provided as the urging force, wherein the rotational force imparting mechanism includes a third cam member (71) disposed to the third hinge member (50) and having a cylindrical shape and a fourth cam member (72) disposed to the fourth hinge member (60) and disposed above the third cam member, wherein another shaft member (80) is inserted and passed through the third cam member and the fourth cam member;

wherein, when the second object (6) goes down by a deadweight, the deadweight of the second object (20) is converted to a rotational force to a closing direction or an opening direction, wherein in a process where the second hinge member (20) goes down together with the second object (6) while rotating to the closing direction or the opening direction, accompanied with a cam action of the first cam part (32) and the second cam part (35), the linear damper (31) is pressed and contracted.

5. A hinge device of claim 4, wherein the linear damper (31) and the first cam part (32) are disposed to the first hinge member (10), and wherein the second cam part (35) is consisted of a second cam member configured as a separated body from the second hinge member (20), and the second cam member is attached to the second hinge member adjustably in a position to an orthogonal direction to its shaft line with respect to the shaft member (40).

6. A hinge device of claim 5, wherein the rotation shaft line and extends vertically, and the linear damper (31) and the first cam part (32) are disposed to the first hinge member (10) such that the first cam part includes a slanted cam face (32*x*) slanting higher and higher as going to the closing direction or the opening direction and becoming higher and higher as going farther from the rotation shaft line.

* * * * *